June 4, 1929.  J. R. REPLOGLE  1,716,150
REFRIGERATED FOOD CABINET
Filed Aug. 25, 1924  4 Sheets-Sheet 1
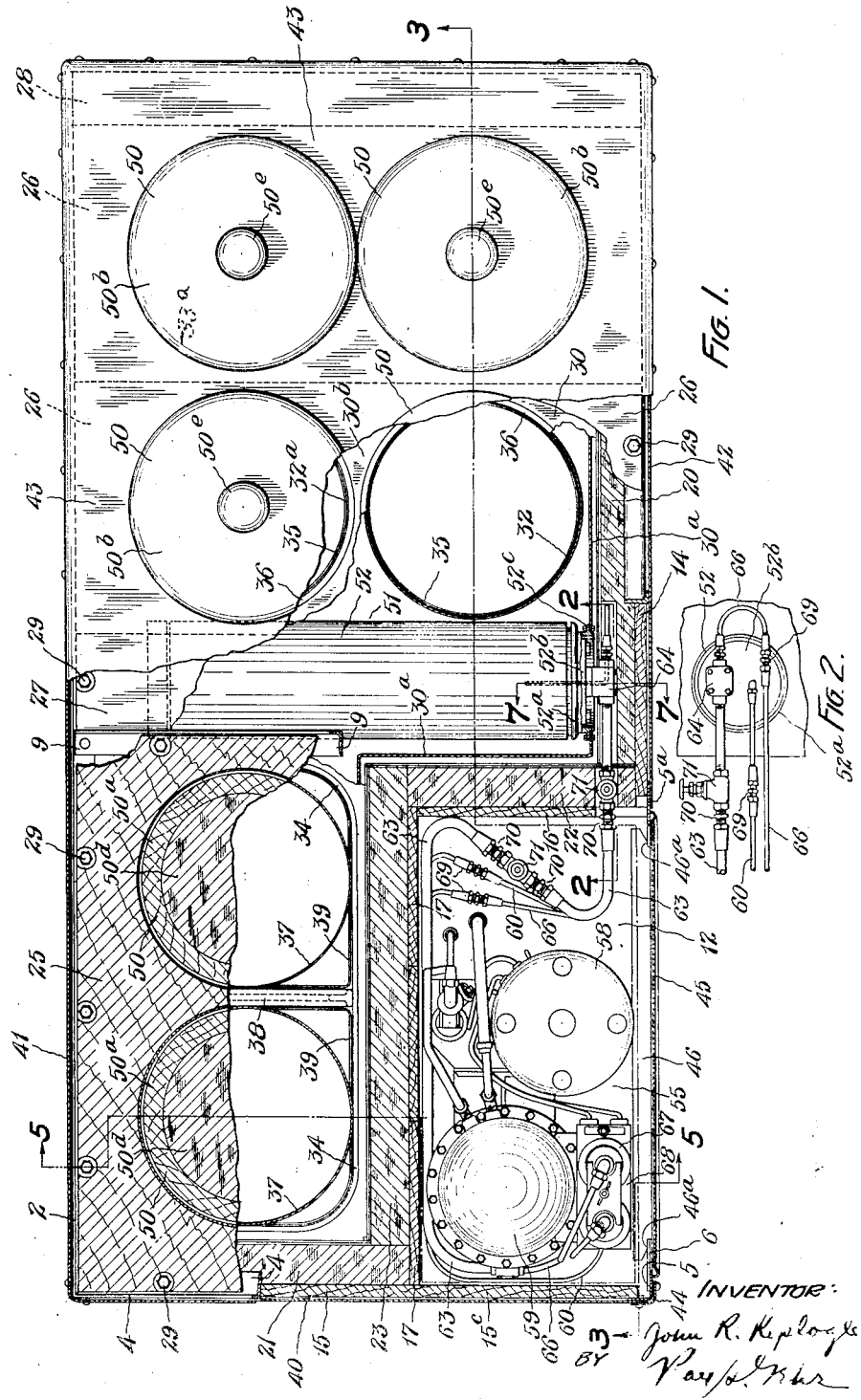

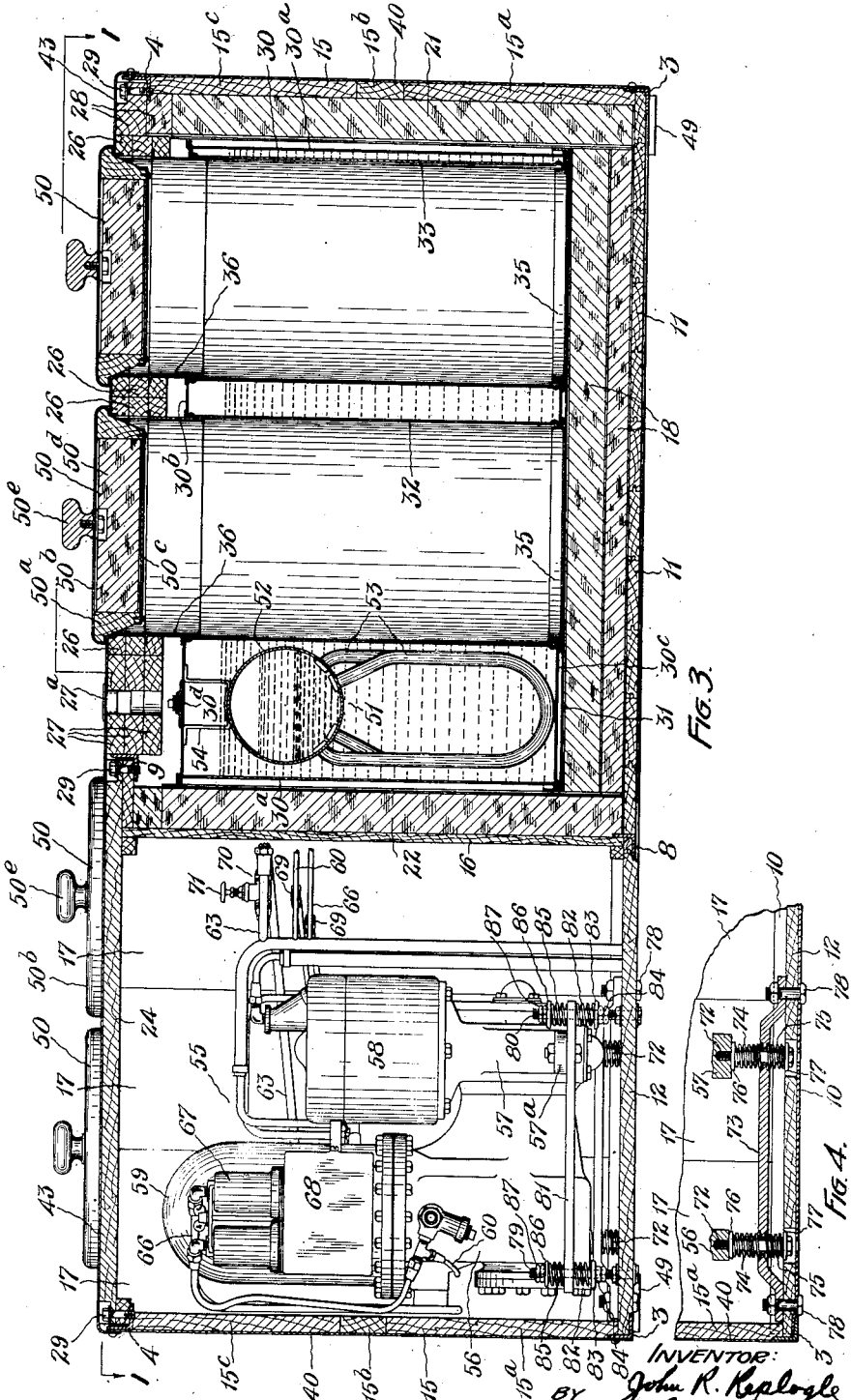

June 4, 1929.  J. R. REPLOGLE  1,716,150
REFRIGERATED FOOD CABINET
Filed Aug. 25, 1924   4 Sheets-Sheet 3
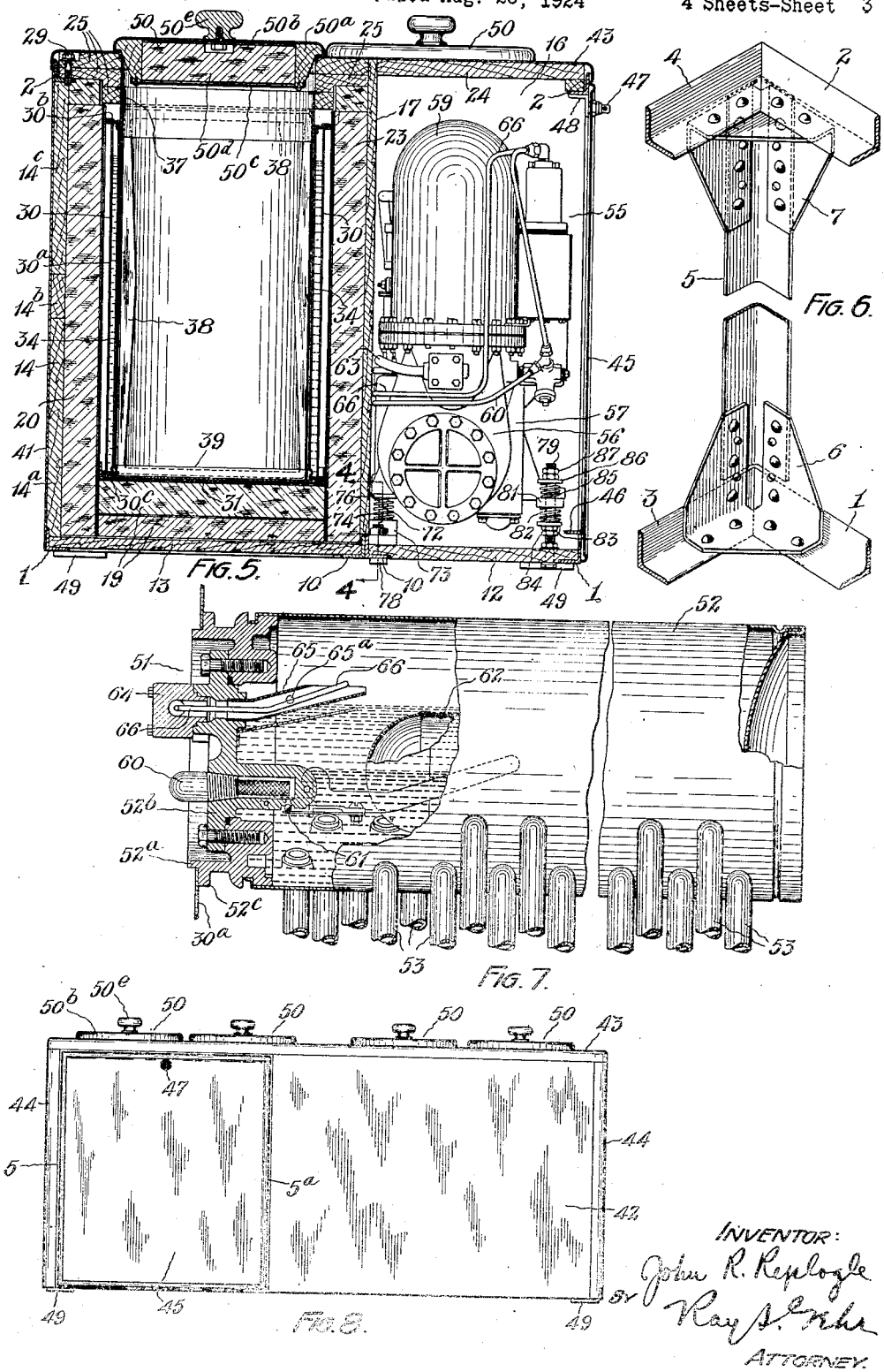

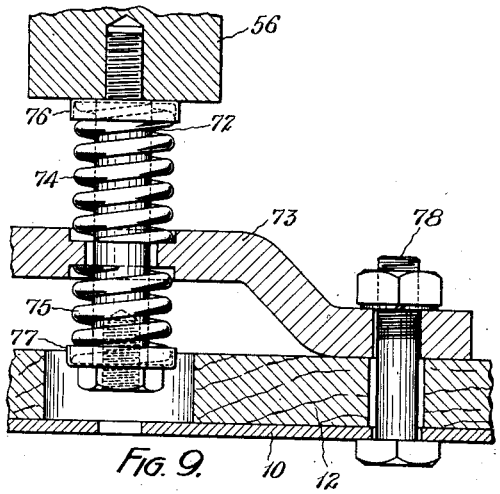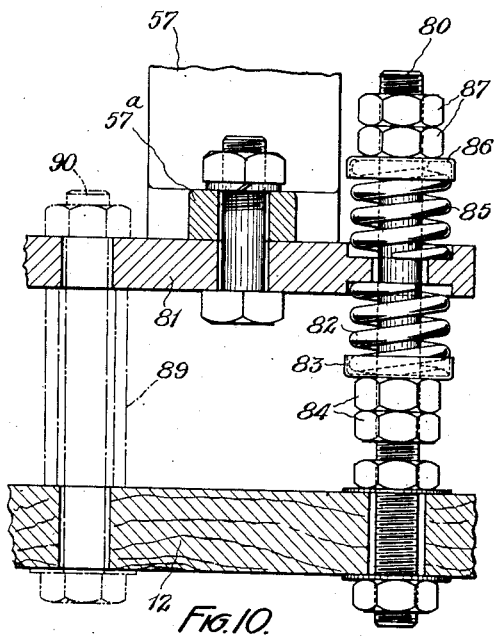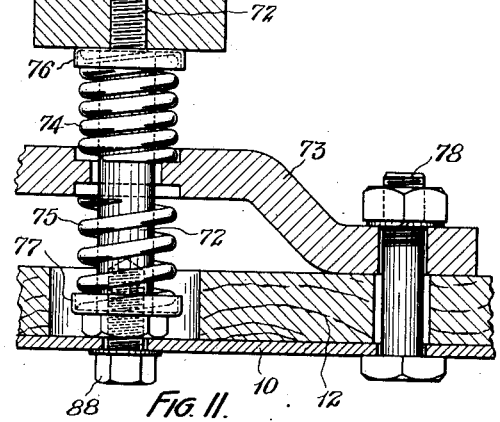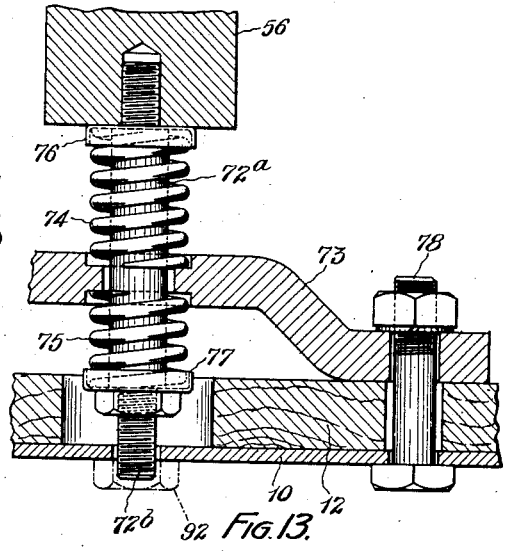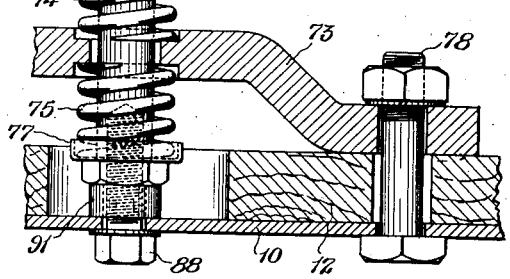

Patented June 4, 1929.

1,716,150

UNITED STATES PATENT OFFICE.

JOHN R. REPLOGLE, OF DETROIT, MICHIGAN, ASSIGNOR, BY MESNE ASSIGNMENTS, TO KELVINATOR CORPORATION, OF DETROIT, MICHIGAN, A CORPORATION OF MICHIGAN.

REFRIGERATED FOOD CABINET.

Application filed August 25, 1924. Serial No. 733,913.

The invention relates to refrigerated cabinets for food and the like and is especially adapted to hold ice cream for dispensing by the retail dealer.

One of the objects of the invention is the provision of a self-contained mechanically refrigerated cabinet having its refrigeration mechanism and its food chambers so arranged that they are always freely accessible even when the cabinet is installed with its ends closely adjacent to soda fountain sections, store counters, or the like.

Another object of the invention is the provision of a cabinet such as last referred to which occupies a minimum of space for a given food capacity.

Another object of the invention is the provision of an ice cream cabinet such as last referred to that is so proportioned that even in the case of 40 gallons and upward capacity it can be readily handled and moved through doors of standard dimensions.

A further object of the invention is the provision of a mechanically refrigerated cabinet for ice cream having for given overall dimensions a maximum capacity for both brick and bulk ice cream.

Another object of the invention is the provision of a mechanically refrigerated food cabinet in which the refrigeration of the food is efficiently and uniformly accomplished.

Another object of the invention is the provision of a mechanically refrigerated cabinet having its compressor-condenser unit and its vaporizer so disposed as to permit the use of short connecting conduits between the compressor-condenser compartment and the vaporizer, thus reducing to a minimum interference with the insulation of the cabinet walls and facilitating assembly and disassembly, while at the same time an effective and efficient cooling of all food chambers is secured.

Another object of the invention is the provision of an automatic mechanical refrigeration apparatus having improved means for insuring the uniform operation of the automatic devices for starting and stopping the compressor of the refrigeration mechanism.

A further object of the invention is the provision of mechanical refrigeration apparatus having an improved mounting for the motor driven compressor designed to minimize noise incident to vibration thereof.

Other objects more or less incident or ancillary to the foregoing will appear in the following description of the preferred embodiment of the invention as shown in the drawings.

In the drawings, Fig. 1 is a plan view of my improved cabinet with some of the parts broken away and some shown in section.

Fig. 2 is a fragmentary front elevation of the parts indicated by the section line 2—2 of Fig. 1.

Fig. 3 is a longitudinal vertical section taken on the broken line 3—3 of Fig. 1.

Fig. 4 is a fragmentary section on the line 4—4, Fig. 5.

Fig. 5 is a section on the broken line 5—5, Fig. 1.

Fig. 6 is a fragmentary view in perspective of the corner construction of the cabinet frame.

Fig. 7 is a fragmentary side elevation of the vaporizer of the refrigeration mechanism with some of the parts broken away and some of the parts shown in section on the line 7—7 of Fig. 1.

Fig. 8 is a front elevation of the cabinet shown on a reduced scale.

Fig. 9 is a fragmentary sectional view of one of the rear spring supports for the compressor.

Fig. 10 is a similar view of one of the front spring supports of the compresser.

Fig. 11 is a view similar to Fig. 9 but showing a shipping attachment applied.

Figs. 12 and 13 are views of the same character as Figs. 9 and 11 showing modifications.

Referring in detail to the construction illustrated, the frame of the cabinet, which is preferably made to a considerable extent of standard structural steel forms, is of the same general character as that illustrated in my pending application Serial No. 673,678 and comprises longitudinally extending bottom members 1, 1 (see Fig. 5) in the form of rolled steel angles, similar longitudinal top members 2, 2, transverse bottom members 3, 3 and transverse top members 4, 4, said top members being supported from the bottom members by steel angles 5, 5 (Fig. 6) at the corners of the cabinet and preferably also by flat steel bars such as 5ᵃ (Fig. 1) intermediate the ends of the cabinet. The bottom frame members 1 and 3 are rigidly connected together and to the lower ends of the upright angles 5 by angle-shaped corner brackets 6, 6, and the top frame members 2 and 4 are similarly connected together and to the upper ends of the corner angles 5 by corner brackets 7, 7, said brackets 6 and 7 being securely riveted to the other members as shown in Fig. 6. The brackets 6 and 7 are preferably stamped from rolled sheet steel and then bent to the form shown in Fig. 6. The frame also comprises additional transverse angle bars 8 and 9 at the bottom and top, respectively, of the cabinet (Fig. 3), the ends of these bars being riveted to the longitudinal angle bars of the frame. There are also a pair of angle bars 10, 10 which extend from the transverse bar 8 to one of the transverse bars 3 (Fig. 5), the bars 10 being securely riveted to the bars 8 and 3.

Within the frame above described are assembled the top, bottom and upright side walls of the cabinet. It will be noted on reference to Figs. 3 and 5 that both the bottom angles 1 and 3 and the top angles 2 and 4 of the frame are arranged with one side of the angle horizontal and the other extending upward therefrom. The transverse angle bars 8 and 9 and the longitudinal bars 10, 10 are similarly arranged. On the horizontal sides of the bottom angles are arranged transverse floor boards 11, 11. A longitudinal floor board section 12 is similarly supported on angles 1, 3, 8 and 10 while a series of transverse floor boards 13 are supported on one of the angles 1 and one of the angles 10. On these floor boards are erected board side walls 14, 15. As indicated in Fig. 1 the front side wall 14 extends only from one end of the cabinet to the upright bar or plate 5$^a$, an opening in the front wall of the cabinet being thus left between said upright frame member and the other end of the cabinet. On the transverse frame member 8 is erected an upright partition wall board 16 (Fig. 1) and on the upper edges of the angle bars 10 are similarly erected partition wall boards 17, 17. As viewed in Fig. 1 the partition wall boards 16, 17 divide the cabinet into a large section which may be described roughly as L-shaped in plan outline and a smaller rectangular section at the left front corner of the cabinet for the compressor-condenser unit of the refrigeration mechanism. The smaller section, in other words, occupies the exterior reentrant angle formed by the partition walls 16, 17.

To render the walls of the food section of the cabinet highly heat-insulating the floor boards are supplemented by slabs 18, 19 of sheet cork and the side wall boards 14, 15 and partition wall boards 16, 17 are similarly supplemented by upright slabs of cork 20, 21, 22 and 23.

Each of the side walls 14 comprises top, middle and bottom strips 14$^a$, 14$^b$ and 14$^c$, respectively. The strips 14$^a$ and 14$^c$ are cut away at their corners adjacent the corner brackets 6 and 7, respectively. The length of the strips is such that their ends do not touch the upright corner angles, thus providing end play to facilitate assembling. The walls 15 comprise similar boards 15$^a$, 15$^b$ and 15$^c$. In assembling the walls the boards are readily inserted through the sides of the frame. First, the board 14$^a$ is inserted, being raised out of engagement with brackets 6 to permit the necessary endwise movement, first in one direction and then the other, to bring both ends of the board back of corner angles 6, 6. Then the board 14$^c$ is inserted in the same manner, being lowered away from the brackets 7 to permit the needed endwise movement. Finally strip 14$^b$ is inserted. Said strip, in conjunction with brackets 6 and 7 hold boards 14$^a$ and 14$^c$ in place and the strip itself is sufficiently held by friction.

The top wall of the cabinet consists of a board section 24 over the compressor-condenser unit compartment, a longitudinally extending timber section 25 supported on the angle bar 9 and angle bars 2 and 4, a pair of similar transverse timber sections 26, 26, a transverse timber section 27 which overlies the vaporizer and a timber section 28 which overlies one of the end walls. The top wall sections 25, 26, 27 and 28 are of laminated board construction and ordinarily afford adequate heat-insulating qualities as well as adequate strength. All of the top wall sections are rigidly secured to the top angles of the frame structure by means of cap screws 29, as shown in Figs. 1, 3 and 5.

Within the heat-insulating walls of the food section of the cabinet is arranged an L-shaped sheet metal tank 30 for anti-freezing solution, such, for example, as brine or a mixture of alcohol and water. I prefer to use the latter mixture rather than brine, but for the sake of convenience, I will refer to the solution as "brine", it being understood that this word is used in a generic sense to indicate any anti-freezing solution. The tank 30 rests upon a shallow sheet metal pan 31 which is supported by the bottom insulation 18, 19. The tank has upright walls 30$^a$ and top and bottom walls 30$^b$, and 30$^c$, respectively. The top and bottom walls are apertured to receive the ends of two pairs of vertical sleeves 32, 32$^a$ and 33, 33$^a$, each of said pairs of sleeves being disposed transversely of the cabinet. In the narrow, left hand end of the cabinet (as viewed in Fig. 1) the top and bottom walls of the tank are apertured to receive the ends of sleeve 34 (Figs. 1 and 5). The sleeves 32, 32$^a$ and 33, 33$^a$ are circular in horizontal section while the sleeve 34 is rectangular except that its corners are rounded as indicated in Fig. 1. The ends of all of the sleeves are connected to the tank walls with liquid-tight joints. The cylindrical sleeves are designed to form receptacles to receive cans of bulk ice cream, or the like, say 5-gallon cans, while the rectangular sleeve 34 is made with flat sides to better accommodate brick ice cream. To take the impact of heavy ice-cream cans each of the cylindrical sleeves is preferably provided at its lower end with a heavy sheet-metal pan 35 which rests upon the bottom pan 31.

The top wall sections 26, 26 of the cabinet are formed with apertures that register with the sleeves 32, 32ª and 33, 33ª and each of the cylindrical sleeves is fitted at its upper end with a guiding or protecting thimble 36. These thimbles are preferably made in the form of split bands with their upper ends flanged outward to engage grooves in the top wall sections 26.

In the case of sleeve 34, the top wall section 25 is preferably provided with two cylindrical apertures of the same size as those which register with the two pairs of cylindrical sleeves and these apertures are fitted with depending thimbles 37, 37 as indicated in Fig. 1.

To brace the long side walls of the sleeve 34 against the inward pressure of the brine in the tank 30, said sleeve has fitted in it an upright rectangular frame 38. This frame rests upon the bottom pan 31 between two shallow pans 39 which are preferably provided in the bottom of the sleeve 34 and serve to hold the bottom of the frame 38 against lateral displacement. The top of said frame is disposed between the thimbles 37 which serve to hold its upper end in position.

To provide the cabinet with suitable exterior finish, attractive in appearance and adapted to resist wear, I preferably provide the upright and top walls with removable casing parts of suitably finished sheet metal. Preferably the upright walls are thus covered with enameled steel sheets of 40, 41, 42 and the top wall with a continuous sheet of Monel metal 43, of a relatively heavy gauge, the latter sheet being formed with depending flanges at all of its edges and also formed with apertures registering with the openings in the top wall sections 25 and 26. The upright corners of the cabinet are finished with angles 44 preferably of polished Monel metal to harmonize with the top 43. The finished sheets and angles are secured by screws to the angle bars of the cabinet frame.

The finishing sheet 42 on the front of the cabinet extends only from the right-hand corner of the cabinet to the upright frame plate 5ª. The opening formed between said upright plate 5ª and the left-hand corner of the cabinet is closed by a removable plate 45 of enameled sheet steel. This closure plate is provided near its lower end with a transverse angle 46 which has its two ends slotted at 46ª to embrace the adjacent corner bracket 6 and frame plate 5ª, respectively (Figs. 1 and 5). At its upper end the closure 45 is apertured to receive a stud 47 carried by an angle bracket 48 secured to the longitudinal angle 2 of the cabinet frame. The stud 47 has its end apertured to receive a padlock (not shown). The closure 45 is readily removed by swinging its top end off the stud 47 and thereby lifting the panel out of engagement with the cabinet. Metal blocks 49 are preferably provided on the under side of the cabinet frame to suitably support it.

Each of the top wall apertures of the cabinet is fitted with a cover 50 which comprises a wooden ring 50ª, a sheet metal top 50ᵇ, a sheet metal bottom 50ᶜ, a heat-insulating disc 50ᵈ of cork or the like and a handle or knob 50ᵉ which is secured to the sheet metal top 50ᵇ. The top 50ᵇ of the cover is preferably made of Monel metal to conform with the top 43 of the cabinet.

The tank 30 has a filling aperture with closure 30ᵈ (Fig. 3) and the top wall section 27 has an opening registering therewith and fitted with a closure 27ª.

Referring now to the mechanical refrigeration apparatus of the cabinet the sleeve 34 and the pair of sleeves 32, 32ª are spaced apart to provide room for an evaporator designated in its entirety by 51. Insofar as some of the present improvements are concerned, this evaporator may be of any desirable or suitable construction, but the one illustrated, and preferred, is like that of the refrigeration apparatus described in my pending application Serial No. 475,344, filed June 6, 1921, and in French Letters Patent No. 547,971, to which reference may be had for a full disclosure of parts not described herein. It is sufficient here to note that the evaporator comprises a header 52 and a series of depending pipe loops or circulating tubes 53. One end of the header comprises an apertured casting 52ª fitted with a removable closure plate 52ᵇ. Casting 52ª has a flange 52ᶜ which is riveted or bolted to the edge of an aperture in the adjacent side wall of the tank 30, as shown in Fig. 1, the joint thus formed being soldered to render it liquid-tight. The lower ends of the pipe loops of the evaporator rest on the bottom wall of the brine tank and the header is preferably also braced from the top wall of the tank by a bracket 54 or the like.

The tank 30 is filled with brine preferably to a level somewhat below its top wall 30ᵇ so that a major part of the sleeves 32, 32ª, 33, 33ª and 34 and the evaporator are immersed in or surrounded by the brine.

In the smaller section or compartment of the cabinet which occupies the reentrant angle of the brine tank is arranged the motor driven compressor-condenser mechanism which is designated in its entirety by 55. As above indicated this unit is of the same character as disclosed in my pending application Serial No. 475,344 and French Patent 547,971, and reference may be had to these latter for full disclosure of those features of construction of the unit not described herein. It is needful to describe the unit as herein shown only sufficiently to make clear the character of the improved refrigeration connections between the unit and the evaporator and the improved mounting of the unit. The said unit comprises a compressor of the reciprocating piston type, an electric motor, interposed gearing through which the motor drives the compressor, a condenser into which the compressor delivers, and control devices for the motor and the condenser water. The compressor comprises a crank case structure 56, within which the crank shaft is mounted, and to the crank case is bolted a gear casing 57, these two casings thus constituting a rigid frame structure. A vertically arranged motor 58 is mounted on the gear casing 57 and through suitable worm gearing in said casing drives the crank shaft of the compressor. On the flanged top of the crank case 56 is mounted a condenser dome 59 within which is arranged suitable water cooling coils (not shown). The interior of the condenser dome 59 is connected by a passage (not shown) in the compressor structure with a conduit 60 which leads to the vaporizer and is connected with an aperture in the closure plate 52$^b$ thereof. The passage through this aperture is controlled by a valve 61 actuated by a float 62 so as to determine the level of liquid refrigerant in the vaporizer. The interior of the crank case 56 of the compressor is connected by a tube 63 with the vapor space in the upper part of the header 52. To this end the closure plate 52$^b$ is formed with an aperture above the aperture for tube 60 and to this aperture is secured a pipe fitting 64 with which the end of tube 63 is connected. The inner end of this same aperture is fitted with an open-ended tube 65 having in its side a drain opening 65$^a$ for lubricant. The pipe fitting 64 is provided with an additional opening to receive a tube 66 which passes through the fitting 64 and the tube 65 so as to have at its open inner end independent communication with the vapor space of the header. This tube 66 extends to and is connected with a bellows-like device 67 adapted to actuate a suitable electric switch within the casing 68 for starting and stopping the electric motor. It will be noted that the tube 66 constitutes a continuous independent passage from the bellows device 67 to the interior of the vapor space of the vaporizer.

The compressor crank case and cylinder, the condenser dome, the evaporator and the pressure device 67, with the connecting tubes 60, 63 and 66, constitute a closed system into which is charged a suitable refrigerant, such as sulphur dioxide. When the compressor is operated by the motor 58 the sulphur dioxide gas is drawn from the crank case, compressed, and discharged under pressure into the condenser 59 where it comes in contact with the water-cooled tubes and is liquefied. This liquefied refrigerant gas then enters the tube 60 and is conducted to the evaporator 51 into which it is admitted under control of the float valve in the header. In the liquefied refrigerant more or less of the compressor lubricant is dissolved and in the vaporizer header the lubricant and refrigerant separate by gravity, the former floating on the latter, as indicated by the light and heavy lines in Fig. 7, and the excess overflowing through aperture 65$^a$ and suction pipe 63 to the crank case of the compressor. In the evaporator the liquid refrigerant is vaporized and absorbs heat from the brine, and thereafter, in a gaseous state, returns through the tube 63 to the crank case of the compressor.

At times it is desirable to separate the compressor-condenser unit from the vaporizer (in case, for example, factory repair of the compressor-condenser unit became desirable), and to facilitate such operation I provide the tubes 60 and 66 with one or more separable couplings 69, 69 and provide the larger tube 63 with separable couplings 70, 70 and two manual cut-off valves 71, 71. When it is desired to remove either the compressor-condenser unit from the cabinet or the vaporizer, the couplings 69, 69 are separated and the adjacent ends of the tubes 60 and 66, which are preferably made of copper, are pinched off and tightly closed with suitable clamps. Then, the valves 71, 71 having been closed, the couplings 70 between the valves are separated and the said unit or the vaporizer can be removed from the cabinet without the escape of any substantial part of the refrigerant. Then, after the desired overhauling of the unit or the vaporizer, it can be recharged with refrigerant in the factory with suitable facilities therefor and can then be remounted in the cabinet and connected up for use without the necessity of recharging the system on the premises of the user of the cabinet, or, without shipping the entire cabinet to the factory.

To render the operation of the refrigeration mechanism as quiet as possible I have devised an improved resilient mounting for the compressor-condenser unit. Two brackets or lugs are formed on the rear sides of the casings 56 and 57 and to them are secured depending stud bolts 72, 72 (Figs. 4 and 9). On these studs is arranged an apertured bar 73 with coiled springs 74, 74 surrounding the studs between the bar 73 and the casing lugs and with springs 75, 75 surrounding the lugs between the lower sides of the bar 73 and the heads of the bolts. The studs are fitted at their upper and lower ends with thimbles 76, 77 which serve to center the springs in relation to the studs and the apertures through the bar 73 are counterbored to receive and center the adjacent ends of the springs. The apertures in the bar 73 are large enough to provide a clearance between it and the studs. Bolts 78, 78 serve to rigidly connect the bar 73 to the floor of the cabinet.

At the front side of the compressor-condenser unit two upright studs 79, 80 are rigidly secured to the floor of the cabinet and on these studs is arranged an apertured horizontal bar 81 with springs 82, 82 surrounding the studs and interposed between the bar 81 and centering thimbles 83 which are adjustably supported by nuts 84 on the studs. Similarly springs 85 are interposed between the upper sides of the bar 81 and centering thimbles 86 which engage abutment nuts 87 on the studs. The apertures through the bar 81 afford clearance around the studs 79 and 80 and are counterbored (Fig. 10) to receive and center the adjacent ends of springs 82 and 85. The front side of the gear casing 57 is formed with a bracket or lug 57ª which rests upon and is rigidly bolted to the bar 81.

With the construction described the springs of the suspension devices yieldingly support the unit and yieldingly hold it against movement in all directions. That is to say, by the simple expedient of centering the coiled springs relative to the studs and providing clearance between the studs and the apertured bars through which they pass, the plain and relatively inexpensive coil springs are enabled to afford a yielding and resilient support for the unit adapted to permit limited movement of the unit in any and all directions. In mounting the compressor-condenser unit in its compartment of the cabinet the rear spring supports are preferably assembled on the unit while the front spring supports are assembled on the floor of the cabinet. Then when the unit is lifted into position in its compartment it is necessary only to apply the two bolts 78 to secure the rear suspension rigidly to the cabinet floor and to apply the single bolt which secures the floor bracket 57ª of the unit to the bar 81. When the unit has thus been placed in position in the cabinet the abutment nuts 84, 87 of the floor spring suspension can be adjusted on their studs to level the unit and insure suitable clearance between it and the side walls of the compartment.

To permit the limited freedom of movement which the unit with such a spring suspension must have, the connecting tubes 60, 63 and 66 are made sufficiently long and are suitably disposed so that they will readily flex enough to accommodate the vibratory movements of the unit. The flexibility of the spring mounting above described is such that some means must be provided to secure the unit against undue movement and injury during shipment, and I have provided the following simple means for that purpose. As shown in Fig. 9 the rear spring studs 72 have their lower ends tapped to receive cap screws 88 (see Fig. 11) which are extended upward through apertures in the underlying angle-bar 10. By turning the screws 88 the ends of the studs 72 are drawn down to firm engagement with the angle-bar 10 thus rigidly securing the compressor-condenser unit at its rear side. The front side of the unit is secured to the cabinet frame and casing structure by introducing a spacer sleeve 89 (Fig. 10) between the bar 81 and the floor of the cabinet and inserting securing bolt 90, the bar 81 and the floor being apertured to receive said bolt. These securing devices are very readily applied and detached and serve when applied to safely hold the compressor-condenser unit against dangerous movement during shipment.

Fig. 12 indicates a slight modification of the rear securing device illustrated in Figs. 9 and 11. In this modification, by simply introducing a spacer 91 between the head of the stud 72 and the angle plate 10 the screw 88 serves to rigidly secure the stud to the plate without materially compressing the springs 74.

In Fig. 13 is shown another modification in which the lower end of a modified stud 72ª is formed with a threaded extension 72ᵇ which projects through the aperture of the angle plate 10 and is adapted to be engaged by a nut 92 to draw the stud down until its head engages with the plate 10.

A refrigerated ice-cream cabinet constructed and fitted as above described is capable of maintaining its food compartments at a desired temperature for indefinite periods with a minimum of attention. As soon as the temperature of the brine surrounding the food compartments rises above a certain point the vapor pressure in the header 52 of the vaporizer starts the motor of the compressor and this withdraws the vaporized gas in the evaporator and compresses and liquefies it, and the lowering of the pressure in the evaporator immediately increases the rate of vaporization therein with the resultant lowering of the temperature. As soon as the temperature, and consequently the pressure, in the header 52 falls to a certain point the compressor motor is automatically disconnected from the power line and the compressor stopped. With the construction illustrated this automatic control of the compressor is effected very reliably and uniformly because the pressure actuated device which controls the motor switch is maintained at all times in free and direct communication with the vapor space of the vaporizer, so that the control device responds at all times to the true temperature-pressure condition of the saturated refrigerant gas or vapor in the vaporizer, and this uniform responsiveness of the switch control device can never be interfered with, for example, by liquid lubricant or liquid refrigerant in any part of the conduit 63, 64, 65. It will be understood that the automatic operation of the compressor and of the float valve in the vaporizer maintains a body of liquid refrigerant in the vaporizer at all times so that there is always saturated refrigerant vapor in the vapor space of the vaporizer.

By arranging the food compartments and the machine compartment as shown and described the utmost compactness is obtained. At the same time the food chambers are all readily accessible and the machine compartment is always accessible by removing the closure plate 45 and the cabinet can have its ends disposed closely adjacent to walls, counters, fountain sections or the like without interfering with the accessibility of the machine compartment. Furthermore, with the food chambers and vaporizer arranged as described the former are all efficiently cooled by the convection circulation of the brine in the tank. In addition, the arrangement of the vaporizer close to the compressor-condenser compartment facilitates the assembly and disassembly of the refrigerating mechanism in the cabinet and when it is necessary in servicing the cabinet to expose the conduits leading to the vaporizer this can be done without disturbing much of the wall insulation of the cabinet. The rectangular or elongated chamber affords a maximum capacity for brick ice cream in proportion to the space occupied by it, and at the same time bricks stored in it are conveniently accessible through the relatively small and light closures 50.

In the operation of the refrigeration mechanism extreme quietness is secured by the spring suspension of the compressor-condenser unit because the amount of vibration transmitted from the unit to the cabinet walls is practically nil.

It is to be understood that in so far as some of the above described improvements are concerned, any gas liquefying means can be used in lieu of the compressor-condenser unit which has been described.

While I have shown and described the preferred construction embodying my improvements it will be understood that the constructions illustrated can be more or less widely varied without departing from the invention, the scope of which is indicated by the appended claims.

What I claim is:

1. In a refrigerated cabinet for food and the like, the combination of a rectangular frame and casing structure comprising bottom, side and top walls; a partition dividing the structure into two main compartments and comprising an upright wall section extending transversely of the longitudinal axis of the cabinet; a brine tank disposed in one of said compartments; a plurality of open-topped food chambers extending downward into the brine tank and having their upper ends opening through the top wall of the cabinet; closures for said food chambers; and means for cooling the brine in said tank comprising a gas liquefying means disposed in the other main compartment of the cabinet, a vaporizer having a horizontal elongated header and a plurality of depending pipe loops with their ends connected to the header, said vaporizer being disposed in the brine tank adjacent and substantially parallel to the said transverse partition wall, and the vaporizer header having one of its ends connected with a liquid-tight joint to the adjacent side wall of the brine tank at the periphery of an aperture through said wall, and conduits operatively connecting the gas liquefier and vaporizer, said conduits having communication with the vaporizer through the aforesaid end of the header independently of the said side wall of the brine tank.

2. In refrigeration apparatus, the combination with a vaporizer; and means for constantly maintaining a body of liquid refrigerant therein comprising gas liquefying means, means for actuating the gas liquefying means and conduits for conducting liquefied refrigerant from the liquefying means to the vaporizer and vaporized refrigerant from the vaporizer back to the liquefying means; of means for automatically stopping and starting the operation of the gas liquefying means comprising a fluid-pressure-actuated device and a conduit for operatively connecting the last named device with the vapor space of said vaporizer, said conduit opening at the vaporizer end directly into said vapor space and constituting a continuous passage between said space and the fluid-pressure-actuated device unaffected by conditions in the said conduit for vaporized refrigerant, so that the fluid-pressure-actuated device uniformly responds to changes of vapor pressure in the vapor space of the vaporizer.

3. In refrigeration apparatus, the combination with a vaporizer; and means for constantly maintaining a body of liquid refrigerant therein comprising a compressor, a condenser and a motor for driving the compressor, said vaporizer, compressor and condenser being connected in series by conduits to form a closed refrigerant system; of means for automatically stopping and starting the motor comprising a fluid-pressure-actuated device and a conduit operatively connecting the last named device with the vapor space of said vaporizer, said conduit opening at the vaporizer end directly into said vapor space and constituting a continuous passage between said space and the fluid-pressure-actuated device unaffected by conditions in the conduit connecting the vaporizer and the compressor so that the fluid-pressure-actuated device uniformly responds to changes of vapor pressure in the vapor space of the vaporizer.

4. In refrigeration apparatus, the combination of a compressor; a condenser; a motor to drive the compressor; a fluid-pressure-actuated device for starting and stopping the motor; a vaporizer adapted to hold liquid refrigerant in its lower part and expanded gaseous refrigerant in its upper part and having in its walls apertures adapted to admit and discharge liquid and gaseous refrigerant, respectively; a conduit leading from the condenser to the liquid refrigerant aperture of the vaporizer; a pipe fitting connected to the vapor discharge aperture of the vaporizer and having one opening for a vapor discharge conduit and a second opening; and a tube extending from the said fluid pressure actuated device to the second opening in said pipe fitting and thence into the vapor space of the vaporizer.

5. In refrigeration apparatus, the combination of a frame and casing structure having a food-cooling compartment and a refrigerant compressor compartment; a vaporizer in the former compartment; a motor-driven compressor in the latter compartment; means for movably supporting the compressor comprising a plurality of resilient devices which are constructed and arranged to yieldingly resist all movements in all directions of the compressor relative to the frame and casing structure; and metal pipes connecting the compressor and vaporizer and adapted to permit limited movement of the compressor relative to the vaporizer.

6. In refrigeration apparatus, the combination of a frame and casing structure having a food-cooling compartment and a refrigerant compressor compartment; a vaporizer in the former compartment; a motor driven compressor in the latter compartment; means for movably supporting the compressor comprising a plurality of springs which are constructed and arranged to yieldingly resist all movements in all directions of the compressor relative to the frame and casing structure; and metal pipes connecting the compressor and vaporizer and adapted to permit limited movement of the compressor relative to the vaporizer.

7. In refrigeration apparatus, the combination with a vaporizer; and means for constantly maintaining a body of liquid refrigerant therein comprising gas liquefying means; and means for actuating the gas liquefying means and conduits adapted to conduct liquefied refrigerant from the liquefying means to the vaporizer and vaporized refrigerant from the vaporizer to the liquefying means; of means for automatically stopping and starting the operation of the gas liquefying means comprising a fluid-pressure actuated device and duct means for conducting vaporized refrigerant directly from the vapor space in said vaporizer to actuate said fluid-pressure device; said duct means being unaffected by conditions in said conduit for vaporized refrigerant.

In testimony whereof I affix my signature.

JOHN R. REPLOGLE.